US012583195B2

(12) United States Patent
Ishihara

(10) Patent No.: US 12,583,195 B2
(45) Date of Patent: Mar. 24, 2026

(54) MOLD FOR FORMING A TIRE AND TIRE PRODUCTION METHOD

(71) Applicant: BRIDGESTONE CORPORATION, Tokyo (JP)

(72) Inventor: Yasuyuki Ishihara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 137 days.

(21) Appl. No.: 18/563,180

(22) PCT Filed: Nov. 24, 2021

(86) PCT No.: PCT/JP2021/043051
§ 371 (c)(1),
(2) Date: Nov. 21, 2023

(87) PCT Pub. No.: WO2022/269942
PCT Pub. Date: Dec. 29, 2022

(65) Prior Publication Data
US 2024/0269947 A1 Aug. 15, 2024

(30) Foreign Application Priority Data
Jun. 22, 2021 (JP) ................................. 2021-103649

(51) Int. Cl.
*B29D 30/06* (2006.01)
(52) U.S. Cl.
CPC ................................ *B29D 30/0629* (2013.01)
(58) Field of Classification Search
CPC ............ B29D 30/0601; B29D 30/0606; B29D 30/0629; B29D 2030/0607

USPC ........................................................ 425/28.1
See application file for complete search history.

(56) References Cited

U.S. PATENT DOCUMENTS

| 5,066,448 A | 11/1991 | Chlebina et al. |
| 7,572,120 B2 | 8/2009 | Ouyahia et al. |

FOREIGN PATENT DOCUMENTS

| CN | 102179947 A | | 9/2011 |
| EP | 0479079 A2 | | 4/1992 |
| JP | H08142057 A | | 6/1996 |
| JP | 2000102927 A | * | 4/2000 |
| JP | 2000127173 A | | 5/2000 |
| JP | 2000326332 A | | 11/2000 |
| JP | 2000334740 A | | 12/2000 |
| JP | 2006341415 A | | 12/2006 |

(Continued)

OTHER PUBLICATIONS

Kata Takehiro, JP-2000102927-A, machine translation. (Year: 2000).*

(Continued)

*Primary Examiner* — Sedef E Paquette
(74) *Attorney, Agent, or Firm* — KENJA IP LAW PC

(57) ABSTRACT

Provided are a mold for forming a tire (1) including an annular tread molding part (20) which is configured to be opened and closed by moving a plurality of segments (21) in a radial direction, and a tire production method using the same. In the mold for forming the tire (1), each of the segment (21) includes an extrusion member (30) which protrudes from a tread design surface (20c) for forming a tread (2c) of the tire (2) when the tread molding part (20) is opened after vulcanization molding of the tire (1) to press the tread (2c) of the tire (2) after the vulcanization molding.

9 Claims, 8 Drawing Sheets

(56)  References Cited

FOREIGN PATENT DOCUMENTS

| JP | 2009149079 | A | | 7/2009 |
|----|-----------|---|---|--------|
| JP | 2010149401 | A | * | 7/2010 |
| JP | 2011140192 | A | | 7/2011 |
| KR | 1020140009820 | A | | 1/2014 |
| WO | 2014087089 | A1 | | 6/2014 |

OTHER PUBLICATIONS

Nakada Norikatsu, JP-2010149401-A, machine translation. (Year: 2010).*

Sep. 26, 2024, search result of the Extended European Search Report issued by the European Patent Office in the corresponding European Patent Application No. 21947221.4.

Dec. 14, 2023, International Preliminary Report on Patentability issued in the International Patent Application No. PCT/JP2021/043051.

Jan. 25, 2022, International Search Report issued in the International Patent Application No. PCT/JP2021/043051.

Jan. 30, 2026, search result of Office Action issued by the China National Intellectual Property Administration in the corresponding Chinese Patent Application No. 202180099055.0.

* cited by examiner

FIG. 8

MOLD FOR FORMING A TIRE AND TIRE PRODUCTION METHOD

TECHNICAL FIELD

This disclosure relates to a mold for forming a tire and a tire production method.

BACKGROUND

In a known conventional mold for forming a tire for use in vulcanization molding of an unvulcanized raw tire to produce a tire, it is known that an annular tread molding part (a tread mold) for forming a tread of a tire is divided into a plurality of segments arranged in a circumferential direction and is configured to be opened and closed by moving each of the segments in a radial direction (for example, see PTLs 1 to 3).

CITATION LIST

Patent Literature

PTL 1: JP 2000-326332 A
PTL 2: JP 2000-334740 A
PTL 3: JP 2009-149079 A

SUMMARY

Technical Problem

However, in the above-described conventional mold for forming a tire or the above-described conventional tire production method, when the tire is released from the tread molding part after vulcanization molding, each of the segments is moved toward a radially outer side with maintaining the orientation of each of the segments to a tread of the tire. As a result, all portions of the tread design surface for forming the tread of the segment are to peel off from the tread simultaneously. Therefore, there has been a problem in that a great driving force is required for driving the segments in the initial stage of mold releasing of the tire.

This disclosure has been accomplished in view of the above-described problem and it is an object of this disclosure to provide a mold for forming a tire and a tire production method which can reduce driving force required for driving the segments in the initial stage of mold releasing of the tire.

Solution to Problem

The mold for forming the tire of this disclosure is a mold for forming a tire for vulcanization molding of an unvulcanized raw tire into a tire, the mold including an annular tread molding part which is divided into a plurality of segments arranged in a circumferential direction and which is configured to be opened and closed by moving each of the segments in a radial direction, wherein each of the segments includes an extrusion member which protrudes from a tread design surface for forming a tread of the tire when the tread molding part is opened after vulcanization molding of the tire to press a tread of the tire after the vulcanization molding.

In an embodiment, the mold for forming the tire of this disclosure can be configured to include an outer ring which is moved along a tapered surface provided in the segment in an axial direction of the tread molding part relatively to the segment to drive the segment toward a radially outer side; and a cam member which is fixed to the outer ring and abuts a rear end of the extrusion member and when the outer ring is moved in a direction of the axis relatively to the segment, drives the extrusion member in a direction to be protruded from the tread design surface.

In an embodiment, the mold for forming the tire of this disclosure can be configured in such a way that the extrusion member is disposed to protrude from a position located one-sidedly on one side of the tread design surface in a direction of an axis of the tread molding part in relation to the center of the tread design surface in the direction of the axis of the tread molding part.

In an embodiment, the mold for forming the tire of this disclosure can be configured in such a way that each of the segments is provided with the plurality of the extrusion members in a manner spaced apart in a circumferential direction.

In an embodiment, the mold for forming the tire of this disclosure can be configured in such a way that when the tread molding part is opened after vulcanization molding of the tire, the first extrusion member provided in the first segment protrudes from the first tread design surface, and subsequently, the second extrusion member provided in the second segment protrudes from the second tread design surface.

The tire production method of this disclosure is a tire production method for vulcanization molding of an unvulcanized raw tire to produce a tire by using a mold for forming a tire including an annular tread molding part which is divided into a plurality of segments arranged in a circumferential direction and which is configured to be opened and closed by moving each of the segments in a radial direction, wherein when each of the segments is moved toward a radially outer side to open the tread molding part, an extrusion member is protruded from a tread design surface for forming a tread of the tire to release the tire from tread molding part with the tread of the tire after the vulcanization molding being pressed by the extrusion member.

Advantageous Effect

This disclosure can provide a mold for forming a tire and a tire production method which can reduce driving force required for driving the segments in the initial stage of mold releasing of the tire.

BRIEF DESCRIPTION OF THE DRAWINGS

In the accompanying drawings:

FIG. 8 is a cross-sectional view of the state of the extrusion member and the cam member when the tread molding part begins to be opened, which is illustrated in a front view.

DETAILED DESCRIPTION

Figure 1:
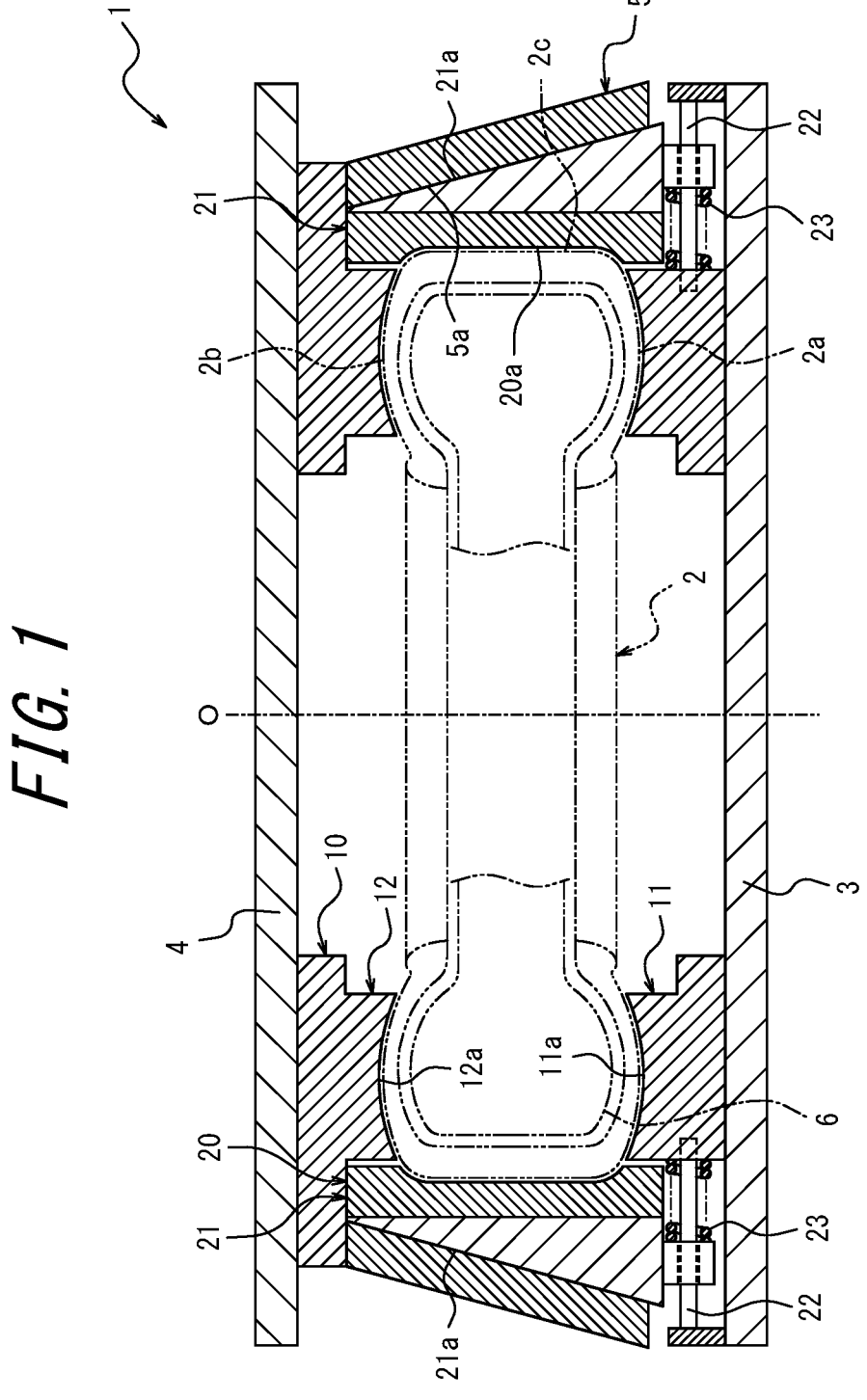
FIG. 1 is a cross-sectional view of a mold for forming a tire according to an embodiment of this disclosure, which is illustrated in a front view.

By way of example, a mold for forming a tire and a tire production method according to an embodiment of this disclosure will now be described in detail with reference to the drawings. In this regard, common members and portions appearing in the drawings have the same reference signs.

A mold for forming a tire 1 illustrated in FIG. 1 according to an embodiment of this disclosure is for use in forming an unvulcanized (before vulcanization) raw tire based on a synthetic rubber into a predetermined shape with the raw tire being vulcanized to produce a tire 2.

In this regard, the tire 2 is a hollow tire based on a synthetic rubber including a pair of sidewalls 2a, 2b and a tread 2c, and is shaped to provide the interior of the tire 2 with a space for filling of a gas such as air or nitrogen.

The mold for forming the tire 1 includes a sidewall molding part 10 and a tread molding part 20.

For example, the sidewall molding part 10 can include an annular lower sidewall molding part 11 fixed to a top surface of a lower container 3, and an annular upper sidewall molding part 12 fixed to a bottom surface of an upper container 4.

Figure 3:
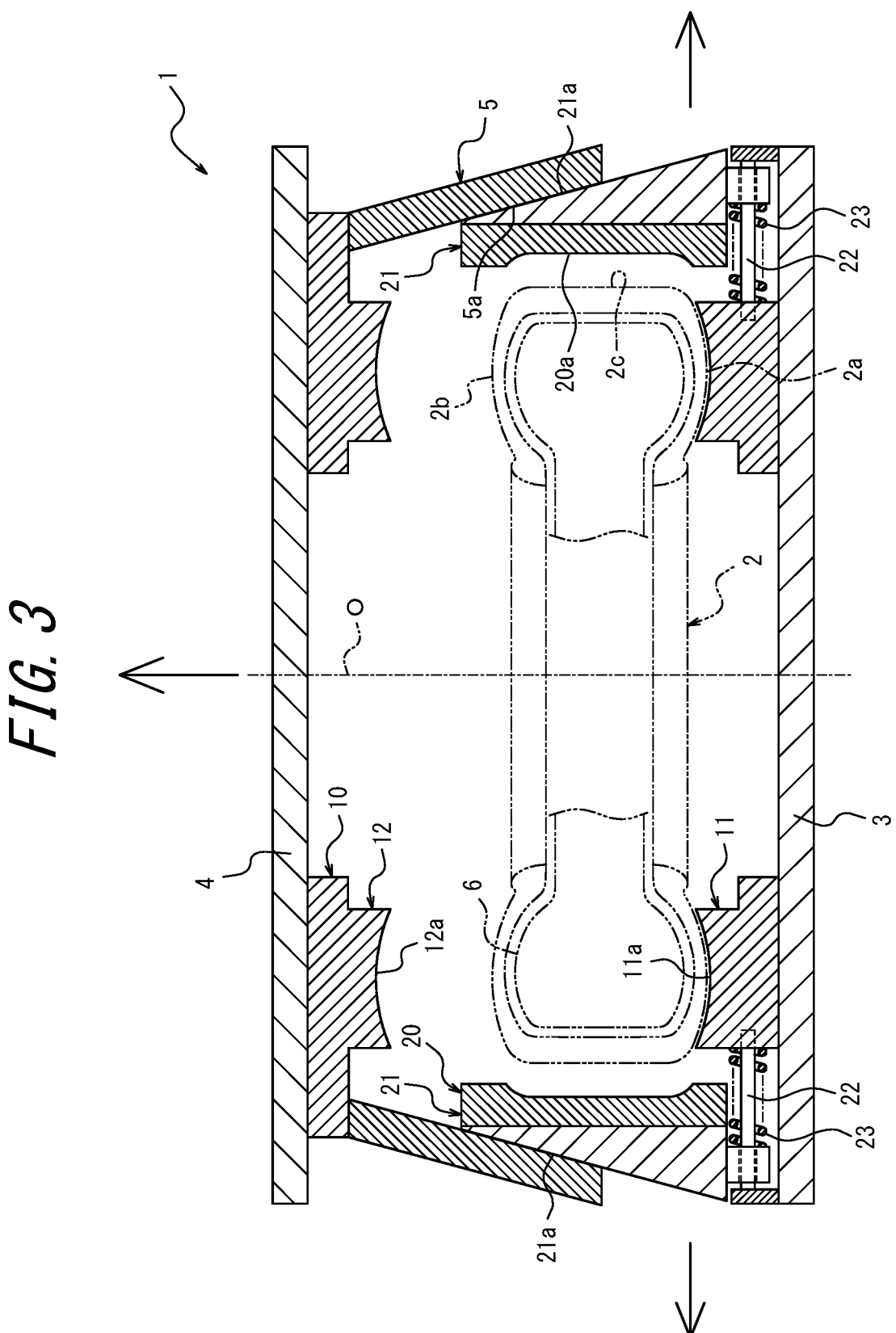
FIG. 3 is a cross-sectional view of the mold for forming the tire illustrated in FIG. 1 when the mold for forming the tire is opened, which is illustrated in a front view.

The sidewall molding part 10 can dispose (accommodate) an annular tire 2 or a raw tire between the lower sidewall molding part 11 and the upper sidewall molding part 12 to be in an orientation by which the central axis of the raw tire becomes coaxial with the central axis O of the sidewall molding part 10. The lower sidewall molding part 11 includes a lower sidewall design surface 11a, which is in the form of a ring around the central axis O and is oriented toward the upward direction. The lower sidewall molding part 11 can form an outer surface of a sidewall 2a of one of the tire 2 or the raw tire (any of which is oriented toward the downward direction in FIG. 1) by the lower sidewall design surface 11a. Similarly, the upper sidewall molding part 12 includes an upper sidewall design surface 12a, which is in the form of a ring around the central axis O and is oriented toward the downward direction. The upper sidewall molding part 12 can form an outer surface of a sidewall 2b of the other of the tire 2 or the raw tire (any of which is oriented toward the upward direction in FIG. 1) by the upper sidewall design surface 12a. As illustrated in FIG. 3, by moving the upper container 4 upwardly (the direction in which the upper container 4 and the lower container 3 is moved away from each other along the central axis of the tire 2) and relatively to the lower container 3, the sidewall molding part 10 is opened and the tire 2 is released from the sidewall molding part 10. By moving the upper container 4 downwardly to its original position illustrated in FIG. 1, the sidewall molding part 10 in an opened configuration is closed to allow for forming of the tire 2 or the raw tire.

In this regard, modifications can be made to the configuration of the sidewall molding part 10 as appropriate, and examples of such modifications include a configuration in which the sidewall molding part 10 is opened by moving the lower container 3 downwardly and relatively to the upper container 4.

The tread molding part 20 is annular and coaxial with the sidewall molding part 10 and is disposed adjacent to a radially outer side of the lower sidewall molding part 11 and the upper sidewall molding part 12. The inner circumferential surface oriented toward the radially inner side of the tread molding part 20 is a tread design surface 20a for forming an outer circumferential surface of the tread 2c of the tire 2.

Figure 2:
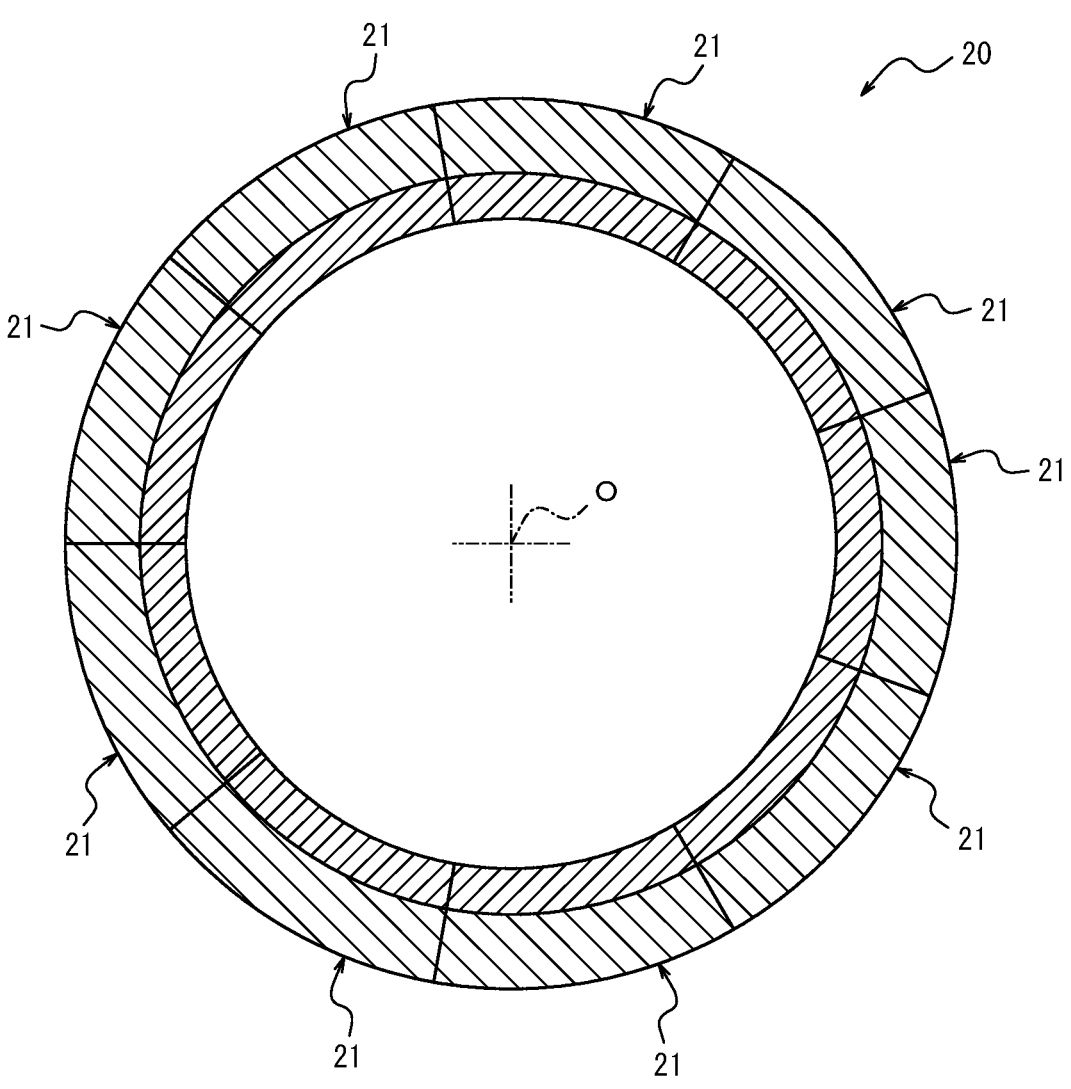
FIG. 2 is a cross-sectional view of the tread molding part illustrated in FIG. 1, which is illustrated in a planar view.

As illustrated in FIG. 2, the tread molding part 20 is divided into a plurality of segments 21 arranged in a circumferential direction. Each of the segments 21 is in the form of arc in a planar view and the segments 21 are combined in a circumferentially arranged manner to constitute a tread molding part 20, which is an annular mold as a whole. In this embodiment, the tread molding part 20 is divided into nine segments 21 having the same length in a circumferential direction. In this regard, the division number of the tread molding part 20 in a circumferential direction is preferably, but not limited to, 7 to 13 and can be changed as appropriate.

As illustrated in FIG. 1, each of the segments 21 is supported by a guide rail 22 extending in a radial direction of the segment 21, and the guide rail 22 is supported by the lower container 3 and the lower sidewall molding part 11. As a result, each of the segments 21 can be moved in a radial direction centered on the axis of the tread molding part 20 (central axis O). The tread molding part 20 can be opened and closed by moving each of the segments 21 in a radial direction.

More particularly, the outer circumferential surface of each of the segments 21 oriented toward the radially outer side is provided with a tapered surface 21a inclined in such a way that the outer diameter of the tapered surface 21a gradually becomes smaller toward the upward direction. The outer ring 5 is annular and fixed to the bottom surface of the upper container 4 to be disposed the radially outer side of the segment 21. The inner circumferential surface of the outer ring 5 oriented toward the radially inner side is provided with a tapered surface 5a inclined in such a way that the outer diameter of the tapered surface 5a gradually becomes smaller toward the upward direction. The outer ring 5 is coupled with each of the segments 21, for example, by using a guide member (not illustrated) in such a way that the tapered surface 5a slides along the tapered surface 21a of the segment 21 in an up-down direction. Also, a spring member 23 is disposed between each of the segments 21 and the lower sidewall molding part 11, and each of the segments 21 is biased toward the radially outer side by the spring member 23 corresponding to each of the segments 21.

Figure 4:
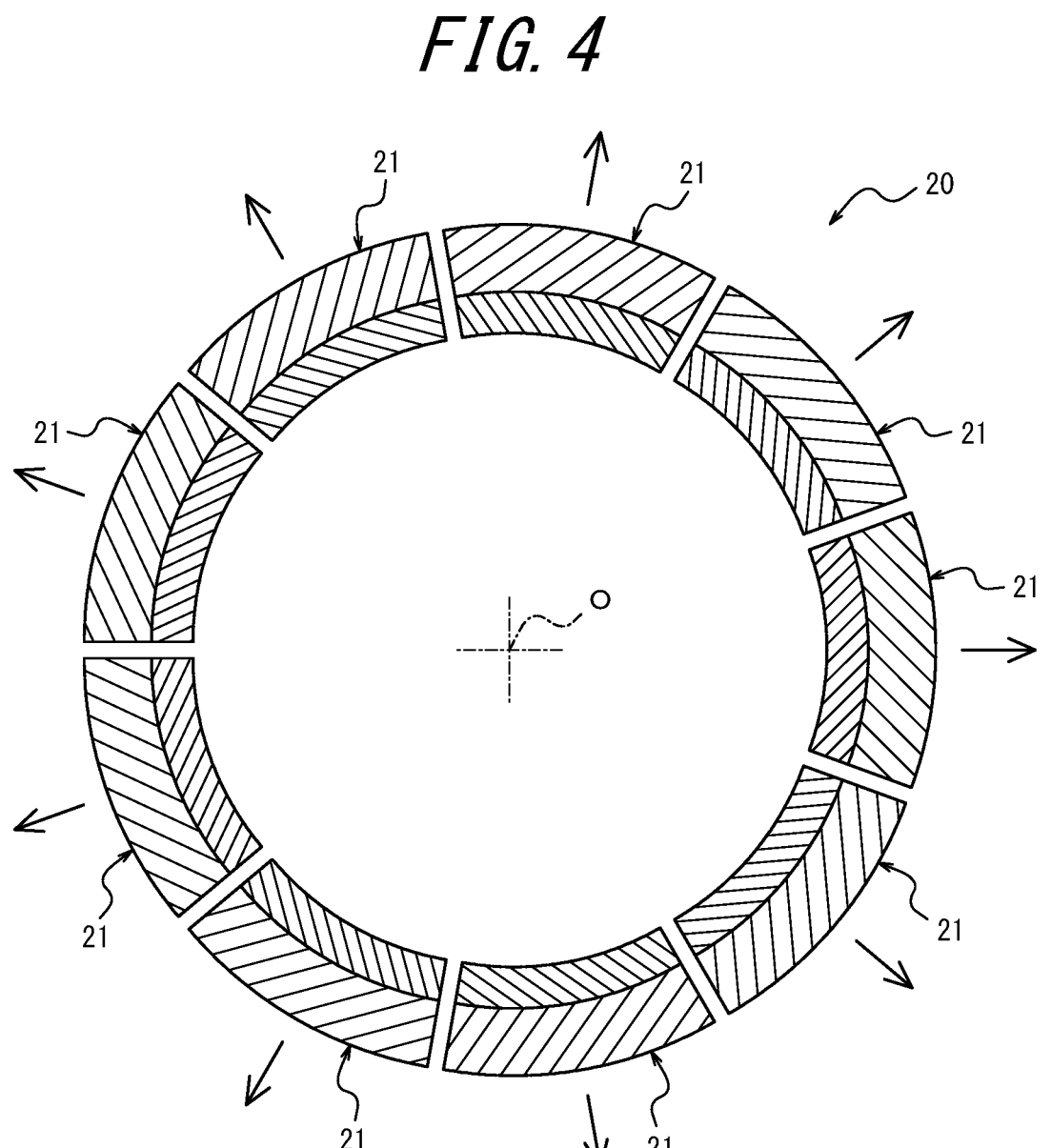
FIG. 4 is a cross-sectional view of the tread molding part illustrated in FIG. 1 when the tread molding part is opened, which is illustrated in a planar view.

When upper container 4 is moved upwardly and relatively to the lower container 3, the outer ring 5 is moved toward the side of the upward direction, that is, one side of the axial direction of the tread molding part 20 relatively to each of the segments 21 with the tapered surface 5a being sliding along the tapered surface 21a of the segment 21. As a result of this, as illustrated in FIGS. 3 and 4, each of the segments 21 is driven by the outer ring 5 and also biased by spring member 23 to move toward the radially inner side centered on the axis of the tread molding part 20. In consequence, the tread molding part 20 is opened to be in a position at which the tread design surface 20a is separated from the tread 2c of the tire 2 or the raw tire When the upper container 4 is moved downwardly to its original position illustrated in FIG. 1, the tread molding part 20 is moved downwardly to a position adjacent to the lower sidewall molding part 11. Subsequently, the outer ring 5 is moved downwardly in relation to each of the segments 21, and each of the segments 21 is moved toward the radially inner side centered on the axis of the tread molding part 20. As a result of this, as illustrated in FIGS. 1 and 2, each of the segments 21 is driven by the outer ring 5 to move toward the radially inner side, and the tread molding part 20 is closed to allow for forming of the tire 2 or the raw tire.

As described above, in the mold for forming the tire 1 of this embodiment, the annular tread molding part 20 is divided into a plurality of segments 21 arranged in a circumferential direction, and is configured to be opened and closed by moving each of the segments 21 in a radial direction.

The mold for forming the tire 1 includes a bladder 6 which is disposed in the interior of the raw tire and expanded by supplying of pressurized steam. Also, the mold for forming the tire 1 includes a heater (not illustrated) for heating the sidewall molding part 10 and the tread molding part 20. The location of the heater can be determined as appropriate.

Figure 5:
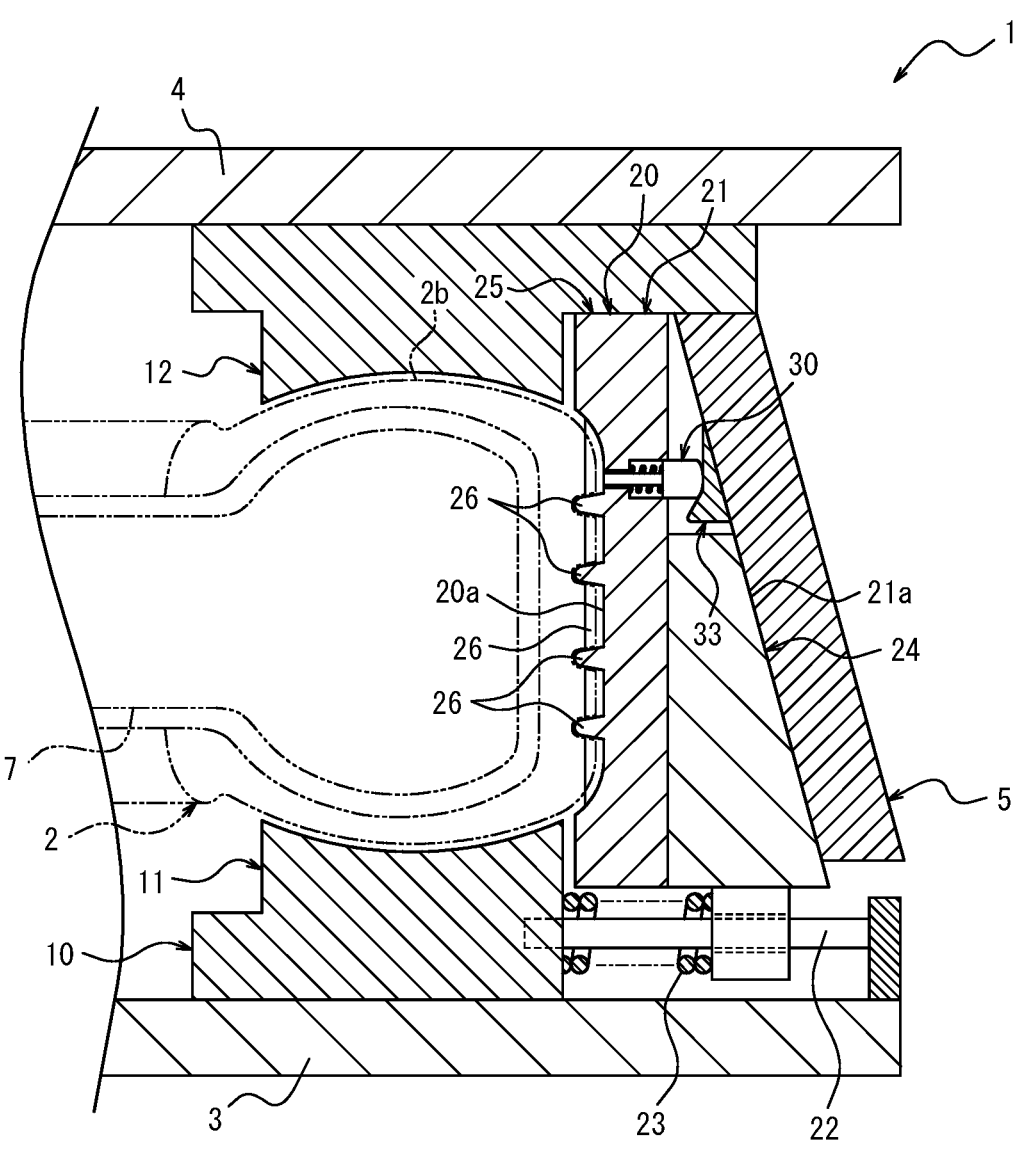
FIG. 5 is an enlarged cross-sectional view of detailed structure of the main portion of the mold for forming the tire illustrated in FIG. 1, which is illustrated in a front view.

As illustrated in FIG. 5, in the mold for forming the tire 1 of this embodiment, each of the plurality of the segments 21 constituting the tread molding part 20 includes a holder 24 and a design surface dividing mold part 25.

The holder 24 is a portion to be driven toward a radial direction by the outer ring 5 when the tread molding part 20 is opened and closed, and the outer circumferential surface of the holder 24 constitutes a tapered surface 21a. The holder 24 can be formed, for example, by cutting a block made of metal such as low carbon steel.

The design surface dividing mold part 25 is a portion which constitutes a tread design surface 20a for forming the tread 2c of the tire 2, and a surface oriented toward the radially inner side constitutes a circumferentially divided portion of the tread design surface 20a. The design surface dividing mold part 25 is disposed on the radially inner side of the holder 24 and is fixed to the holder 24 by using a fixing member such as a bolt (not illustrated).

The design surface dividing mold part 25 can be configured in such a way that the tread design surface 20a is provided with a plurality of projections 26 which protrudes in a radial direction from the tread design surface 20a toward the radially inner side. The plurality of the projections 26 are used to form, for example, grooves or sipes which constitute a tread pattern, on the tread 2c of the tire 2 in vulcanization molding. The plurality of the projections 26 can be of various shapes or sizes (length) tailored to the tread pattern, such as a plurality of projections 26 extending in a tire width direction and a plurality of projections 26 extending in a tire circumferential direction. In this regard, the tread design surface 20a may not be provided with the projections 26.

The design surface dividing mold part 25 is preferably formed by casting of a metal material having high thermal conductivity such as, for example, an aluminum alloy. In this case, for example, rib-shaped or blade-shaped projections 26 made of steel can be provided by integrating with the design surface dividing mold part 25 in casting of the design surface dividing mold part 25.

Each of the segments 21 is provided with an extrusion member 30 which protrudes from a tread design surface 20a for forming of a tread 2c of the tire 2 when the tread molding part 20 is opened after vulcanization molding of the tire 2 to press the tread 2c of the tire 2 after the vulcanization molding.

It is also possible that a plurality of extrusion members 30 are provided in each of the segments 21 in a manner spaced apart in a circumferential direction. In this embodiment, as illustrated in FIG. 7, each of the segments 21 is provided with two extrusion members 30 in a manner spaced apart in a circumferential direction.

Figure 6:
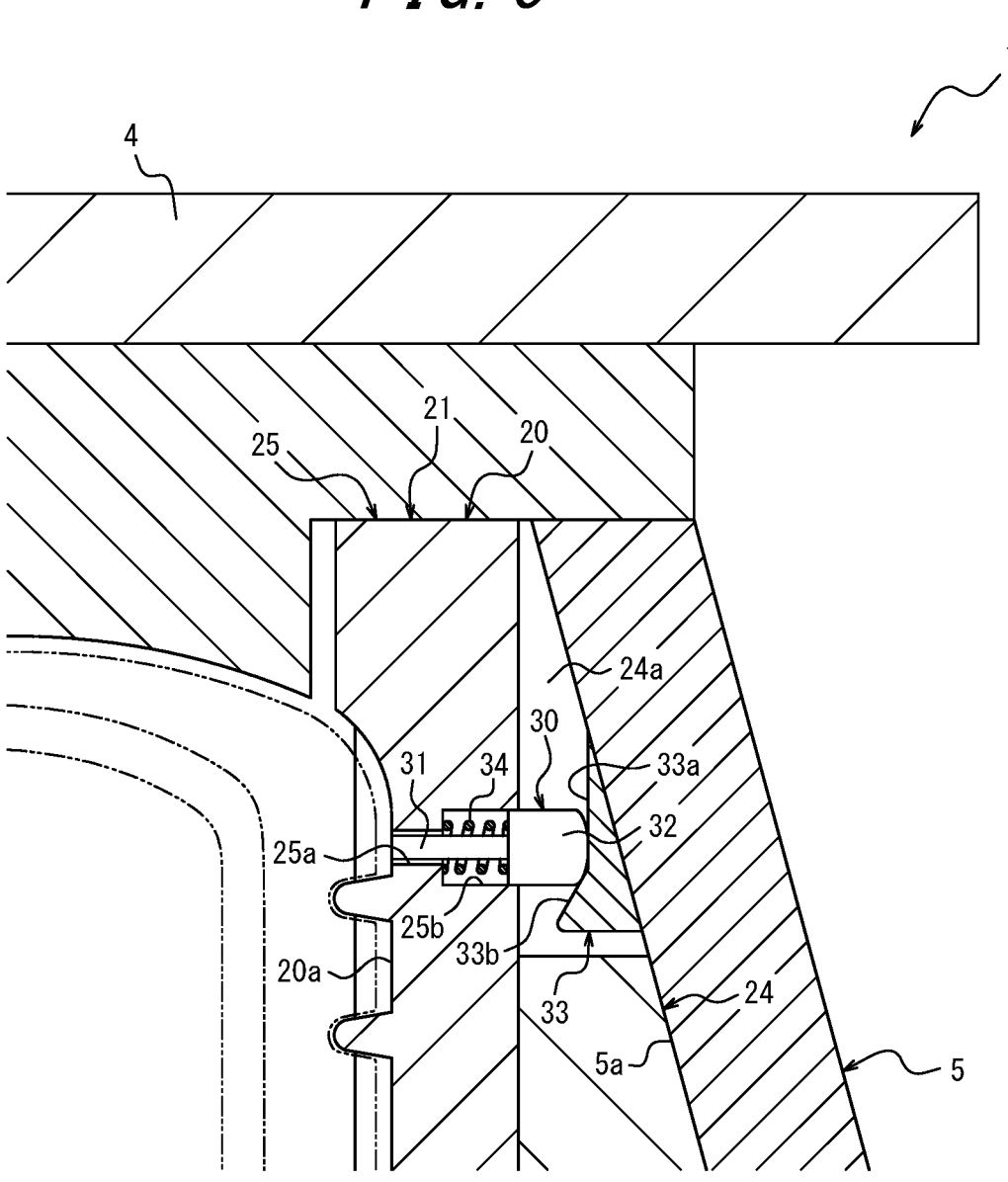
FIG. 6 is an enlarged cross-sectional view of the structure of the extrusion member and the cam member illustrated in FIG. 5, which is illustrated in a front view.
Figure 7:
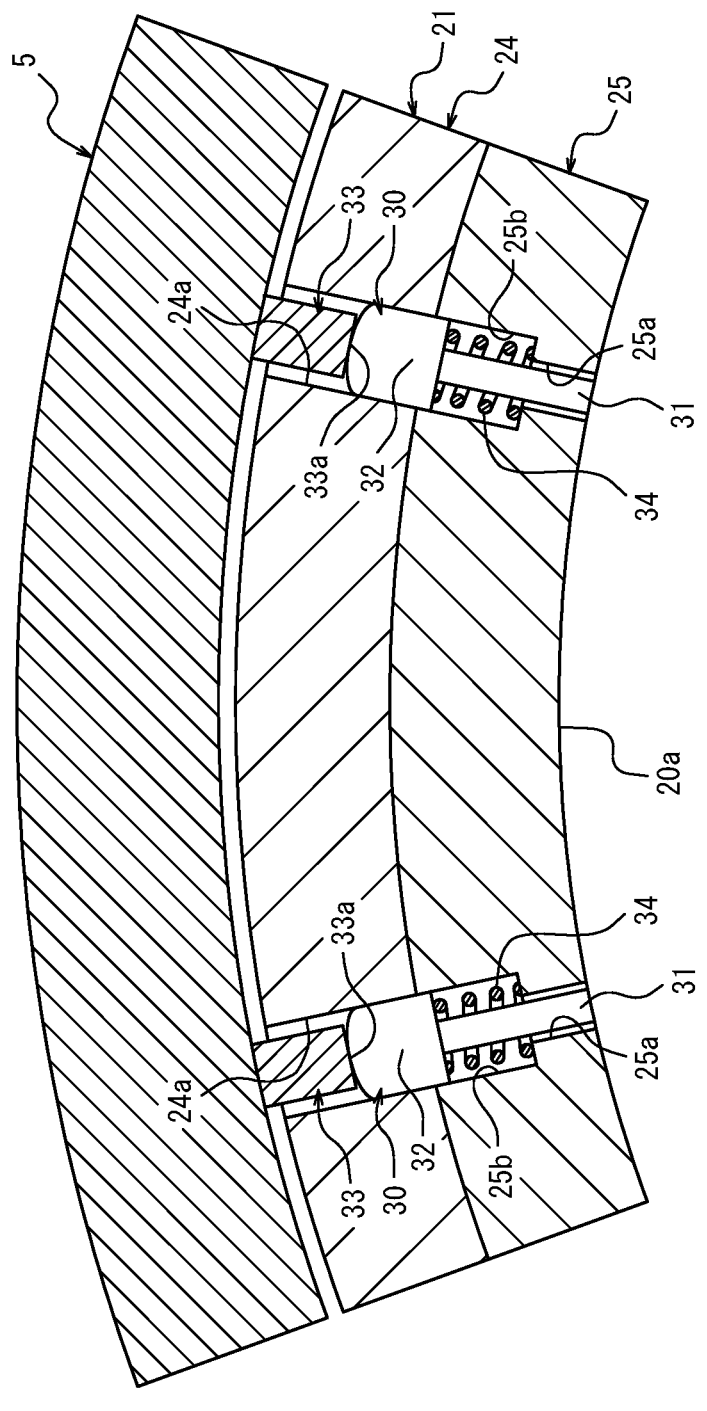
FIG. 7 is an enlarged cross-sectional view of the structure of the extrusion member and the cam member illustrated in FIG. 5, which is illustrated in a planar view.

As illustrated in FIGS. 6 and 7, for the purpose of supporting the extrusion member 30, the design surface dividing mold part 25 is provided with a through hole 25a extending through the design surface dividing mold part 25 in a radial direction. The portion, which is open into the radially outer side, of the through hole 25a is a hole 25b and the diameter of the hole 25b is larger than the diameter of the portion, which is open into the radially inner side, of the through hole 25a. The holder 24 is provided with a notch 24a which is extends through the holder 24 in the closing direction and extends to the upper end of the holder 24. The hole 25b is open into the notch 24a.

In this embodiment, the extrusion member 30 is in the form of pin including a rod 31 and a head 32. The rod 31 is inserted into the through hole 25a and the head 32 is disposed in the hole 25b, and as a result, the extrusion member 30 is supported by the design surface dividing mold part 25 to be movable in a radial direction. A portion of the head 32 is protruded from the hole 25b toward the interior of the notch 24a of the holder 24.

A spring member 34 is disposed between the head 32 and the bottom surface of the hole 25b. The extrusion member 30 is biased toward the radially outer side by the spring member 34.

A cam member 33 is fixed to the inner circumferential surface of the outer ring 5. The cam member 33 includes a flat surface portion 33a, which is parallel to the axis of the tread molding part 20 and oriented toward the radially inner side, and an inclined surface portion 33b, which is continuous with the lower end of the flat surface portion 33a and inclined toward the radially inner side. The cam member 33 is disposed in the interior of the notch 24a of the holder 24. In the situation where the tread molding part 20 is closed, the flat surface portion 33a of the cam member 33 abuts, from the radially outer side, the head 32 constituting the rear end of the extrusion member 30. As a result of this, in the situation where the tread molding part 20 is closed, the extrusion member 30 is retained at a position at which the head 32 abuts the flat surface portion 33a of the cam member 33 and the front end, oriented toward the radially inner side, of the rod 31 is flush with the tread design surface 20a.

When the outer ring 5 is moved in a direction of the axis of the tread molding part 20 (the upward direction in FIGS. 5 and 6) relatively to the segment 21 to open the tread molding part 20, the cam member 33 drives the extrusion member 30 in a direction to protrude from the tread design surface 20a. In other words, when the outer ring 5 is moved upwardly and relatively to the segment 21 to open the tread molding part 20 in FIGS. 5 and 6, the cam member 33 is moved, together with the outer ring 5 in relation to the axial direction of the extrusion member 30, in the upward direction perpendicular to the extrusion member 30. When the cam member 33 is moved upwardly and relatively to the extrusion member 30, the head 32 of the extrusion member 30 is moved along the inclined surface portion 33b and an extrusion member 30 is driven toward the radially inner side by the cam member 33. The extrusion member 30 driven by the cam member 33 is moved toward the radially inner side with the spring member 34 being elastically deformed. As a result of such movement, the front end of the rod 31 protrudes from the tread design surface 20a to the exterior of the design surface dividing mold part 25.

The extrusion member 30 is preferably disposed to protrude from a position located one-sidedly on one side of the tread design surface 20a in a direction of the axis (central axis O) of the tread molding part 20 in relation to the center of the tread design surface 20a in the direction of the axis of the tread molding part 20. In this embodiment, as illustrated in FIG. 5, the extrusion member 30 is disposed to protrude from a position which is located on the side of the upward direction in relation to the center of the tread design surface 20a in the up-down direction (width direction of the tire 2) and at which the extrusion member 30 faces an end of the tread 2c on the side of the sidewall 2b.

Next, a method for vulcanization molding of a raw tire to produce a tire 2 having a predetermined shape by using a mold for forming a tire 1 having the above-described configuration, that is, a tire production method as an embodiment of this disclosure will be described.

First of all, a sidewall molding part 10 and a tread molding part 20 are opened to dispose a raw tire in the interior of a mold for forming a tire 1, and subsequently, the sidewall molding part 10 and the tread molding part 20 are closed.

Next, a bladder 7 is expanded by supplying pressurized steam to the bladder 7 disposed in the interior of the raw tire. As a result, sidewalls of the raw tire are pressed against a lower sidewall design surface 11a and an upper sidewall design surface 12a of the sidewall molding part 10, respectively, and a tread is pressed against a tread design surface 20a of the tread molding part 20. In this situation, a heater is used to heat the sidewall molding part 10 and the tread molding part 20, and such heat causes vulcanization of the synthetic rubber constituting the raw tire to form a tire 2 having a predetermined shape.

After forming of the tire 2 is completed, the sidewall molding part 10 and the tread molding part 20 are opened to remove a formed tire 2.

Figure 8:
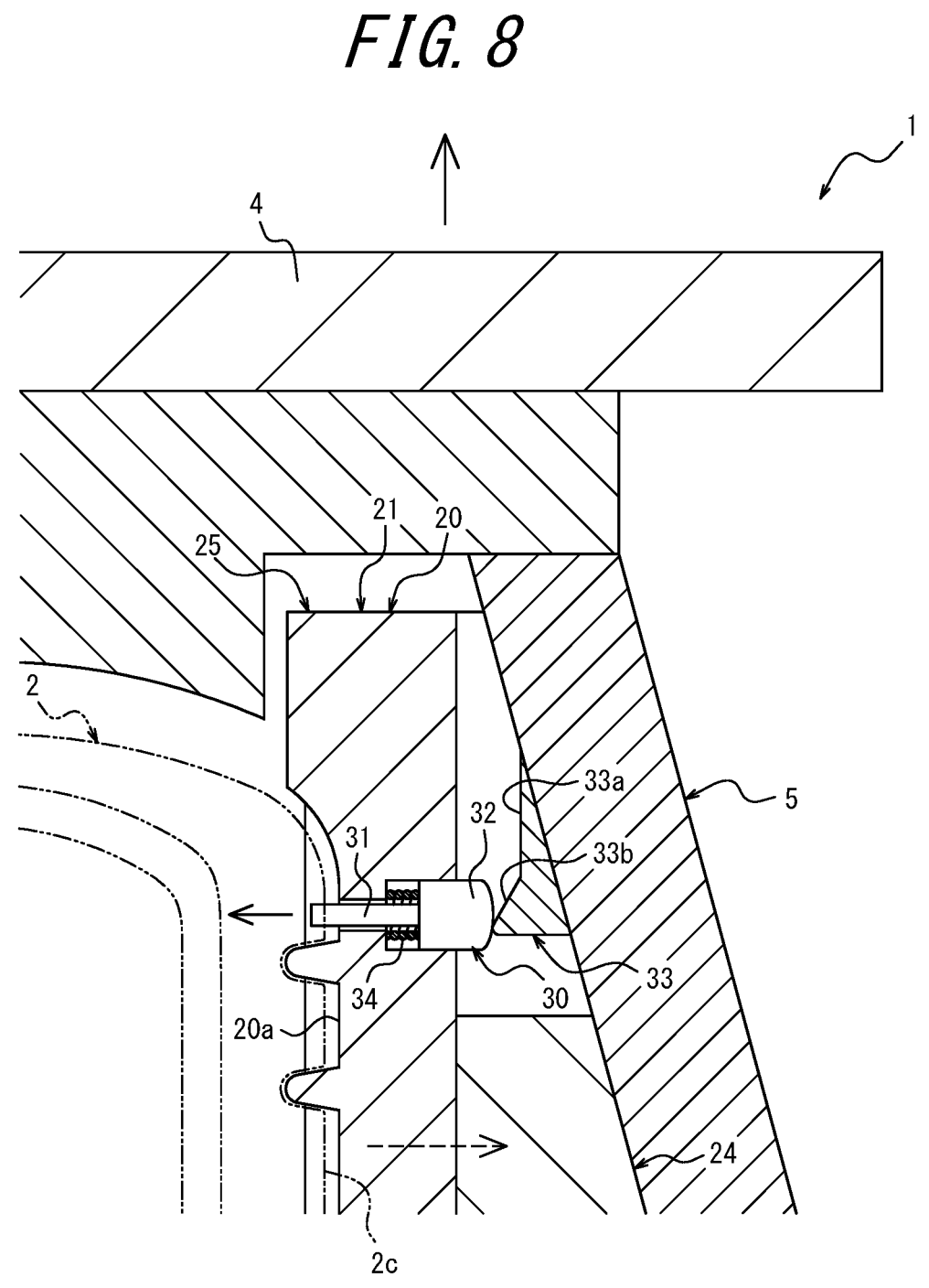

When each of the segments 21 is moved toward the radially outer side to open the tread molding part 20 after vulcanization molding of the tire 2, as illustrated in FIG. 8, the extrusion member 30 is driven by a cam member 33 provided on the outer ring 5 to protrude from the tread design surface 20c, and the tire 2 after the vulcanization molding is released from the tread molding part 20 with the tread 2c being pressed by the extrusion member 30. As a result of this, by using a portion pressed by the extrusion member 30 as the starting point, the tread 2c of the tire 2 in close contact with the tread design surface 20c is gradually released from the tread design surface 20c. In consequence, mold releasing resistance of the tread 2c of the tire 2 from the tread design surface 20a in the initial stage of mold releasing of the tire 2 can be reduced.

As described above, in the tire production method by using the mold for forming the tire 1 of this embodiment, when the tread molding part 20 is opened by moving each of the segments 21 toward the radially outer side, the tire 2 is released from the tread molding part 20 with the extrusion member 30 being protruded from the tread design surface 20a for forming the tread 2c of the tire 2 and the tread 2c of the tire 2 after the vulcanization molding being pressed by the extrusion member 30. Therefore, mold releasing resistance of the tread 2c of the tire 2 from the tread design surface 20a in the initial stage of mold releasing of the tire 2 is reduced, and thus, force required for mold releasing of the tread 2c of the tire 2 from the tread design surface 20a can be reduced. Also, driving force applied to the segments 21 in mold releasing of the tire 2 can be reduced, and as a result, the entire production device including the mold for forming the tire 1 can be downsized to reduce the production costs. In addition, mold releasing resistance of the tread 2c of the tire 2 from the tread design surface 20a can be reduced, and as a result, the generation of residual strain (permanent deformation) in the tire 2 after the mold releasing can be suppressed to improve the initial performance of the tire 2.

In particular, in this embodiment, the extrusion member 30 is disposed to protrude from a position located one-sidedly on one side of the tread design surface 20c in a direction of the axis of the tread molding part 20 in relation to the center of the tread design surface 20c in the direction of the axis of the tread molding part 20. Therefore, by using a portion pressed by the extrusion member 30 as the starting point, the tread 2c of the tire 2 in close contact with the tread design surface 20c is gradually released from the tread design surface 20c, and in addition, outside air is gradually introduced between the tread 2c and the tread design surface 20a from the portion. As a result, force required for the initial stage of mold releasing of the tread 2c of the tire 2 from the tread design surface 20a can be further reduced.

Also, in this embodiment, the mold for forming the tire 1 includes an outer ring 5 which is moved along a tapered surface 21a provided in the segment 21 in an axial direction of the tread molding part 20 relatively to the segment 21 to drive the segment 21 toward a radially outer side; and a cam member 33 which is fixed to the outer ring 5 and abuts a rear end (head 32) of the extrusion member 30 and when the outer ring 5 is moved in a direction of the axis of the tread molding part 20 relatively to the segment 21, drives the extrusion member 30 in a direction to be protruded from the tread design surface 20c. Therefore, when the outer ring 5 is activated to start mold releasing of the tire 2 from the tread molding part 20, the extrusion member 30 protrudes from the tread design surface 20c with the operation of the outer ring 5. In consequence, the tread 2c of the tire 2 can be released reliably from the tread design surface 20a by the extrusion member 30 in the initial stage of mold releasing of the tire 2.

In addition, in this embodiment, each of the segments 21 is provided with a plurality of extrusion members 30 in a manner spaced apart in a circumferential direction. Therefore, at each of the segments 21, a plurality of places in the tread 2c of the tire 2 after the vulcanization molding are pressed by a plurality of extrusion members 30 to release the tire 2 can be released more reliably from the tread molding part 20. In particular, in the case where a plurality of extrusion members 30 is disposed to protrude from a position located one-sidedly on one side of the tread design surface 20c in a direction of the axis of the tread molding part 20 in relation to the center of the tread design surface 20c in the direction of the axis of the tread molding part 20, the tire 2 is released from the tread molding part 20 by using the entirety of the tread 2c of the tire 2 on one side in a tire width direction as the starting point in the initial stage of mold releasing. In consequent, in the initial stage of mold releasing of the tire 2, force required for mold releasing of the tread 2c of the tire 2 from the tread design surface 20a can be further reduced.

The mold for forming the tire 1 of this embodiment can be configured in such a way that when tread molding part 20 is opened after vulcanization molding of the tire 2, an extrusion member (first extrusion member) 30 provided in one segment (first segment) 21 of a plurality of segments 21 protrudes from a tread design surface (first tread design surface) 20a provided in the segment 21, and subsequently, an extrusion member (second extrusion member) 30 provided in another segment (second segment) 21 of the plurality of the segments 21 protrudes from a tread design surface (second a tread design surface) 20a provided in the segment 21. In other words, an extrusion member 30 disposed in each of segments 21 can be protruded from a tread design surface 20a in such a way that the extrusion members 30 disposed in the respective segments 21 are sequentially activated at different times. In this case, the extrusion members 30 can be protruded, in a circumferentially sequential manner, from the tread design surface 20c in such a way that an extrusion member 30 of one segment 21 is protruded from a tread design surface 20a, and subsequently, an extrusion member 30 of a segment 21 adjacent to the segment 21 is protruded from the tread design surface 20a, and then, an extrusion member 30 of a segment 21 adjacent to the segment 21 is protruded from the tread design surface 20a. As a result of the above-described configuration, in the initial stage of mold releasing of the tire 2, the tread 2c is released from the tread design surface 20a in such a way that portions of the tread 2c is released sequentially in a circumferential direction. In consequence, the tread 2c of the tire 2 can be released from the tread design surface 20a by more small driving force.

As a matter of course, this disclosure is not limited to the above-described embodiment and a variety of modifications are possible without departing from the scope of this disclosure.

For example, the above-described embodiment, each of the segments 21 is provided with the holder 24, the design surface dividing mold part 25 is fixed to the holder 24, and the holder 24 is driven by the outer ring 5. However, the holder 24 can be integrated with the design surface dividing mold part 25.

Also, the number of the extrusion member 30 provided in each of the segments 21 can be changed as appropriate. Also, the shape of the extrusion member 30 and configuration of driving the extrusion member 30 can be changed as appropriate.

REFERENCE SIGNS LIST

1 Mold for forming a tire
2 Tire
2a Sidewall
2b Sidewall
2c Tread
3 Lower container
4 Upper container
5 Outer ring
5a: tapered surface
6 Bladder
10 Sidewall molding part
11 Lower sidewall molding part
11a Lower sidewall design surface
12 Upper sidewall molding part
12a Upper sidewall design surface
20 Tread molding part
20a Tread design surface
21 Segment
21a Tapered surface
22 Guide rail
23 Spring member
24 Holder
24a Notch
25 Design surface dividing mold part
25a Through hole
25b Hole
26 Projection

30 Extrusion member
31 Rod
32 Head
33 Cam member
33a Flat surface portion
33b Inclined surface portion
34 Spring member
O Central axis

The invention claimed is:

1. A mold for forming a tire for vulcanization molding of an unvulcanized raw tire into a tire, the mold comprising:
   an annular tread molding part which is divided into a plurality of segments arranged in a circumferential direction and which is configured to be opened and closed by moving each of the segments in a radial direction, wherein
   each of the segments includes an extrusion member which protrudes from a tread design surface for forming a tread of the tire when the tread molding part is opened after vulcanization molding of the tire to press the tread of the tire after the vulcanization molding,
   the mold further comprises:
   an outer ring which is moved along a tapered surface provided in each of the segments in an axial direction of the tread molding part relatively to each of the segments to drive each of the segments toward a radially outer side; and
   a cam member which is fixed to the outer ring and abuts a rear end of the extrusion member and when the outer ring is moved in a direction of the axis relatively to each of the segments, drives the extrusion member in a direction to protrude from the tread design surface.

2. The mold for forming the tire according to claim 1, wherein
   the extrusion member is disposed to protrude from a position located one-sidedly on one side of the tread design surface in a direction of an axis of the tread molding part in relation to the center of the tread design surface in the direction of the axis of the tread molding part.

3. The mold for forming the tire according to claim 1, wherein
   each of the segments is provided with a plurality of extrusion members in a manner spaced apart in a circumferential direction.

4. The mold for forming the tire according to claim 1, wherein
   the plurality of segments includes a first segment having a first tread design surface and a second segment having a second tread design surface; and
   when the tread molding part is opened after vulcanization molding of the tire, a first extrusion member provided in the first segment protrudes from the first tread design surface, and subsequently, a second extrusion member provided in the second segment protrudes from the second tread design surface.

5. A tire production method for vulcanization molding of an unvulcanized raw tire to produce a tire by using the mold for forming the tire according to claim 1.

6. A mold for forming a tire for vulcanization molding of an unvulcanized raw tire into a tire, the mold comprising:
   an annular tread molding part which is divided into a plurality of segments arranged in a circumferential direction and which is configured to be opened and closed by moving each of the segments in a radial direction, wherein each of the segments includes an extrusion member which protrudes from a tread design surface for forming a tread of the tire when the tread molding part is opened after vulcanization molding of the tire to press the tread of the tire after the vulcanization molding, and the extrusion member is disposed to protrude from a position located one-sidedly on one side of the tread design surface in a direction of an axis of the tread molding part in relation to the center of the tread design surface in the direction of the axis of the tread molding part.

7. The mold for forming the tire according to claim 6, wherein each of the segments is provided with a plurality of extrusion members in a manner spaced apart in a circumferential direction.

8. The mold for forming the tire according to claim 6, wherein the plurality of segments includes a first segment having a first tread design surface and a second segment having a second tread design surface; and when the tread molding part is opened after vulcanization molding of the tire, a first extrusion member provided in the first segment protrudes from the first tread design surface, and subsequently, a second extrusion member provided in the second segment protrudes from the second tread design surface.

9. A tire production method for vulcanization molding of an unvulcanized raw tire to produce a tire by using the mold for forming the tire according to claim 6.

\* \* \* \* \*